(12) United States Patent
Seo et al.

(10) Patent No.: US 11,039,322 B2
(45) Date of Patent: Jun. 15, 2021

(54) METHOD OF TRANSMITTING AND RECEIVING SIGNAL THROUGH UNLICENSED BANDWIDTH IN WIRELESS COMMUNICATION SYSTEM, AND APPARATUS FOR SAME

(71) Applicant: LG Electronics Inc., Seoul (KR)

(72) Inventors: Hanbyul Seo, Seoul (KR); Joonkui Ahn, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/665,643

(22) Filed: Oct. 28, 2019

(65) Prior Publication Data

US 2020/0068410 A1 Feb. 27, 2020

Related U.S. Application Data

(63) Continuation of application No. 15/323,292, filed as application No. PCT/KR2015/006850 on Jul. 3, 2015.
(Continued)

(51) Int. Cl.
*H04W 16/14* (2009.01)
*H04L 1/00* (2006.01)
(Continued)

(52) U.S. Cl.
CPC ........... *H04W 16/14* (2013.01); *H04L 1/0057* (2013.01); *H04L 1/0071* (2013.01); *H04L 5/001* (2013.01);
(Continued)

(58) Field of Classification Search
CPC ..... H04W 16/14; H04W 88/06; H04W 48/18; H04W 72/0453; H04L 1/0057;
(Continued)

(56) References Cited

U.S. PATENT DOCUMENTS

2012/0005550 A1* 1/2012 Ito .................... H04L 1/0009
714/748
2013/0294362 A1 11/2013 Xu et al.
(Continued)

FOREIGN PATENT DOCUMENTS

CN 101523812 9/2009
CN 101741707 6/2010
(Continued)

OTHER PUBLICATIONS

Chinese Office Action in Chinese Application No. 201580036370.3, dated Jul. 3, 2019, 13 pages (with English translation).
(Continued)

*Primary Examiner* — Shailendra Kumar
(74) *Attorney, Agent, or Firm* — Fish & Richardson P.C.

(57) ABSTRACT

In the present application, a method is disclosed of transmitting a downlink data channel from a base station through a terminal in a wireless communication system. In particular, the method comprises the steps of: mapping the downlink data channel to a transmitting resource of a licensed bandwidth or a transmitting resource of an unlicensed bandwidth; and transmitting the mapped downlink data channel via the terminal. The step of mapping the downlink data channel is characterized by comprising the steps of: applying a frequency priority mapping technique when the downlink data channel is mapped to the transmitting resource of the licensed bandwidth; and applying a time priority mapping technique when the downlink data channel is mapped to the transmitting resource of the unlicensed bandwidth.

12 Claims, 16 Drawing Sheets

Related U.S. Application Data

(60) Provisional application No. 62/161,859, filed on May 14, 2015, provisional application No. 62/020,992, filed on Jul. 3, 2014.

(51) Int. Cl.
  *H04W 88/06* (2009.01)
  *H04L 5/00* (2006.01)
  *H04W 48/18* (2009.01)
  *H04W 72/04* (2009.01)

(52) U.S. Cl.
  CPC .......... *H04L 5/0044* (2013.01); *H04L 5/0064* (2013.01); *H04L 5/0087* (2013.01); *H04W 48/18* (2013.01); *H04W 72/0453* (2013.01); *H04W 88/06* (2013.01); *H04L 5/0023* (2013.01); *H04L 5/0039* (2013.01)

(58) Field of Classification Search
  CPC ..... H04L 5/001; H04L 5/0064; H04L 1/0071; H04L 5/0044; H04L 5/0087; H04L 5/0039; H04L 5/0023
  See application file for complete search history.

(56) References Cited

U.S. PATENT DOCUMENTS

| | | | |
|---|---|---|---|
| 2013/0315214 A1 | 11/2013 | Bai et al. | |
| 2014/0192770 A1* | 7/2014 | Soldati | H04L 5/0037 370/330 |
| 2014/0254530 A1* | 9/2014 | Kim | H04L 5/005 370/329 |
| 2015/0067435 A1 | 3/2015 | Yerramalli et al. | |
| 2015/0131554 A1* | 5/2015 | Jiang | H04W 72/042 370/329 |
| 2017/0086213 A1 | 3/2017 | Kalhan | |

FOREIGN PATENT DOCUMENTS

| | | | |
|---|---|---|---|
| CN | 101754288 | 6/2010 | |
| CN | 102484552 | 5/2012 | |
| CN | 103391619 | 11/2013 | |
| KR | 1020120068981 | 6/2012 | |
| WO | WO-2013043026 A2 * | 3/2013 | ............. H04L 5/005 |
| WO | WO2013167967 | 11/2013 | |

OTHER PUBLICATIONS

MediaTek, Analysis in In-Device Coexistence Interference Avoidance, 3GPP TSG RAN WG2 #71, Aug. 23-27, 2010, Madrid, Spain, R2-104444. (Year 2010).

3GPP, "3rd Generation Partnership Project; Technical Specification Group Radio Access NeTwork; Evolved Universal Terrestrial Radio Access {E-UTRA}: Study on signalling and procedure for interference avoidance for in-device coexistence {Release 11 )," 3GPP TR 36.816 V11.2.0; Dec. 2011; pp. 1-44.

Baghel et al., "Coexistence Possibilities of LTE with ISM Technologies and GNSS," NCC, IEEE, Jan. 30, 2011, 5 pages.

* cited by examiner (A) CONTROL-PLANE PROTOCOL STACK (B) USER-PLANE PROTOCOL STACK

METHOD OF TRANSMITTING AND RECEIVING SIGNAL THROUGH UNLICENSED BANDWIDTH IN WIRELESS COMMUNICATION SYSTEM, AND APPARATUS FOR SAME

CROSS REFERENCE TO RELATED APPLICATIONS

This application is a continuation of U.S. patent application Ser. No. 15/323,292, filed Dec. 30, 2016, which claims benefit of PCT International Application No. PCT/KR2015/006850, filed on Jul. 3, 2015, which claims priority under 35 U.S.C. 119(e) to U.S. Provisional Application No. 62/020,992, filed on Jul. 3, 2014 and 62/161,859, filed on May 14, 2015, all of which are hereby expressly incorporated by reference into the present application.

TECHNICAL FIELD

The present invention relates to a wireless communication system, and more particularly, to a method of transmitting and receiving a signal through an unlicensed band in a wireless communication system and an apparatus therefor.

BACKGROUND ART

As an example of a wireless communication system to which the present invention is applicable, a 3rd generation partnership project (3GPP) long term evolution (LTE) communication system will be schematically described.

FIG. 1 is a schematic diagram showing a network structure of an evolved universal mobile telecommunications system (E-UMTS) as an example of a wireless communication system. The E-UMTS is an evolved form of the legacy UMTS and has been standardized in the 3GPP. In general, the E-UMTS is also called an LTE system. For details of the technical specification of the UMTS and the E-UMTS, refer to Release 7 and Release 8 of "3rd Generation Partnership Project; Technical Specification Group Radio Access Network".

Referring to FIG. 1, the E-UMTS includes a user equipment (UE), an evolved node B (eNode B or eNB), and an access gateway (AG) which is located at an end of an evolved UMTS terrestrial radio access network (E-UTRAN) and connected to an external network. The eNB may simultaneously transmit multiple data streams for a broadcast service, a multicast service and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF THE INVENTION

Technical Task

Based on the aforementioned discussion, the present invention intends to propose a method of transmitting and receiving a signal through an unlicensed band in a wireless communication system and an apparatus therefor in the following description.

Technical Solution

To achieve these and other advantages and in accordance with the purpose of the present invention, as embodied and broadly described, according to one embodiment, a method of transmitting a downlink data channel by an eNB to a UE in a wireless communication system, includes mapping the downlink data channel to a transmission resource of a licensed band or a transmission resource of an unlicensed band, and transmitting the mapped downlink data channel to the UE. In this case, the mapping the downlink data channel includes the steps of applying a frequency-first mapping scheme when the downlink data channel is mapped to the transmission resource of the licensed band and applying a time-first mapping scheme when the downlink data channel is mapped to the transmission resource of the unlicensed band.

In this case, when the downlink data channel is mapped to the transmission resource of the unlicensed band, if a size of the downlink data channel is equal to or greater than a threshold, the mapping the downlink data channel can include applying the time-first mapping scheme. In this case, if the size of the downlink data channel is less than the threshold, the downlink data channel can be mapped to the transmission resource of the unlicensed band using the frequency-first mapping scheme.

In addition, when the downlink data channel is mapped to the transmission resource of the unlicensed band, if the downlink data channel includes a plurality of code blocks, the mapping the downlink data channel can include the step of applying the time-first mapping scheme.

Preferably, when the time-first mapping scheme is applied, timing advance equal to or less than a predetermined value can be applied to the UE.

To further achieve these and other advantages and in accordance with the purpose of the present invention, according to a different embodiment, a method of receiving a downlink data channel by a UE from an eNB in a wireless communication system, includes receiving the downlink data channel from the transmission resource of the licensed band or the transmission resource of the unlicensed band, and decoding the downlink data channel. In this case, if the downlink data channel is received through the transmission resource of the licensed band, the downlink data channel is mapped to the transmission resource of the licensed band using a frequency-first mapping scheme and if the downlink data channel is received through the transmission resource of the unlicensed band, the downlink data channel can be mapped to the transmission resource of the unlicensed band using a time-first mapping scheme.

To further achieve these and other advantages and in accordance with the purpose of the present invention, according to a further different embodiment, a method of transmitting a codeword by an eNB to a UE in a wireless communication system, includes dividing the codeword into two or more code blocks, performing channel coding on each of the code blocks, and concatenating the channel coded code blocks, mapping the concatenated code blocks to a transmission resource of a licensed band or a transmission resource of an unlicensed band, and transmitting the mapped codeword to the UE. In this case, the mapping the concatenated code blocks can include applying interleaving to the concatenated code blocks when the concatenated code blocks are mapped to the transmission resource of the unlicensed band.

In this case, the concatenated code blocks are mapped to the transmission resource of the licensed band or the transmission resource of the unlicensed band using a frequency-first mapping scheme.

Advantageous Effects

According to embodiments of the present invention, a UE is able to more efficiently receive a signal through an unlicensed band in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE

Mode for Invention

The configuration, operation and other features of the present invention will be understood by the embodiments of the present invention described with reference to the accompanying drawings. The following embodiments are examples of applying the technical features of the present invention to a 3rd generation partnership project (3GPP) system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

In the present specification, a name of a base station can be used as a comprehensive terminology including an RRH (remote radio head), an eNB, a TP (transmission point), an RP (reception point), a relay, and the like.

Figure 1:
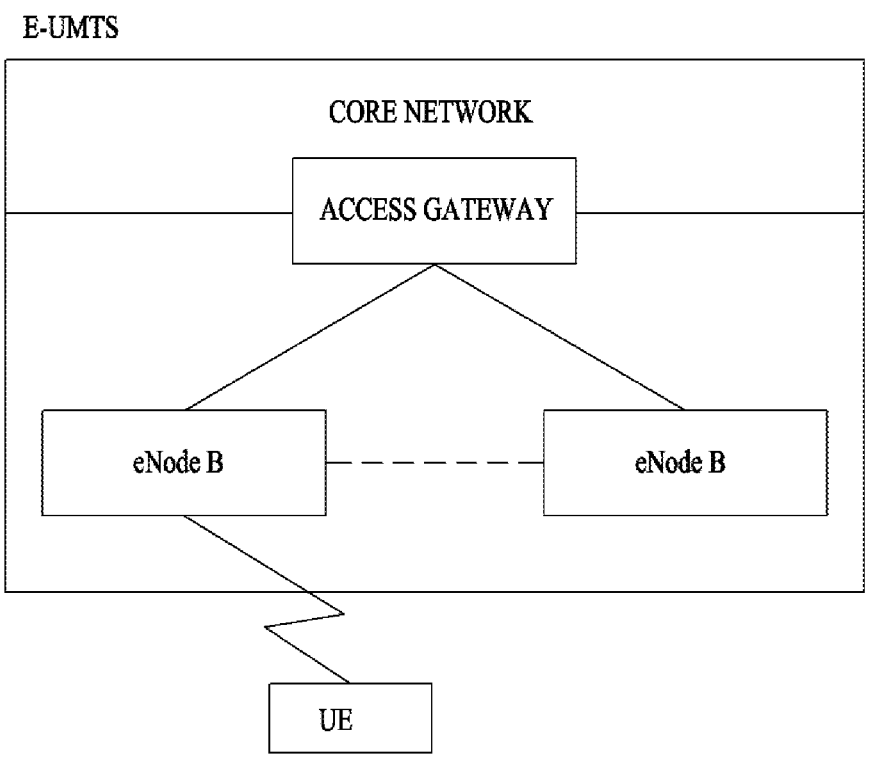
FIG. 1 is a schematic diagram of E-UMTS network structure as one example of a wireless communication system.
Figure 2:
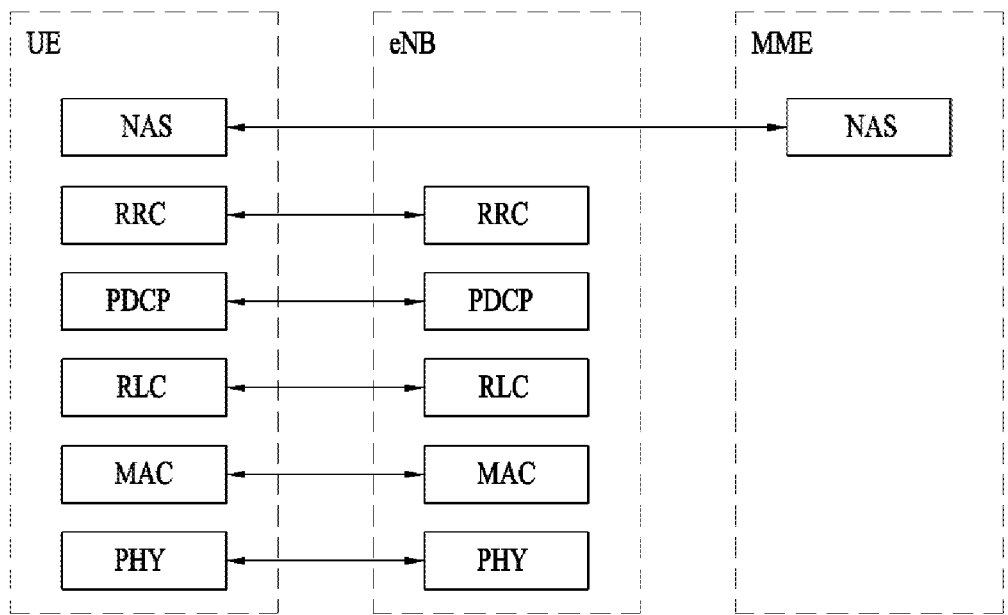
FIG. 2 is a diagram illustrating structures of a control plane and a user plane of a radio interface protocol between a user equipment and E-UTRAN based on the 3GPP radio access network standard.
Figure 2:
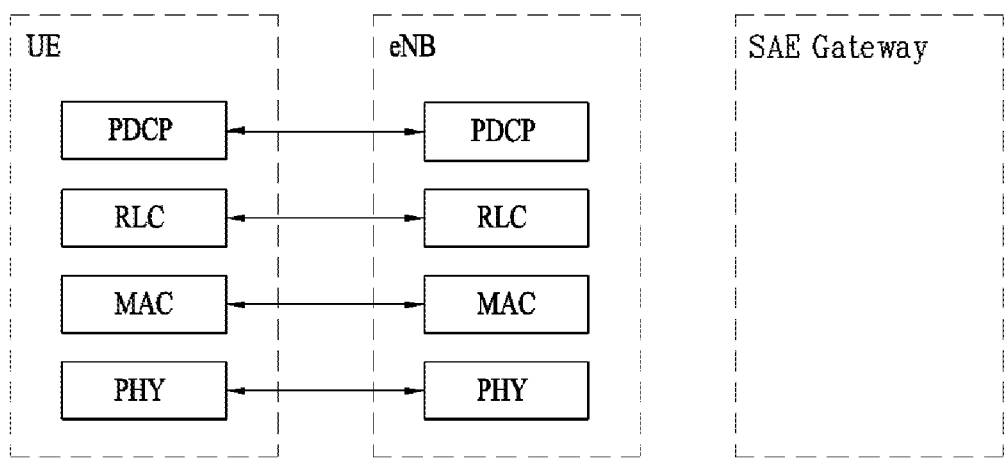

FIG. 2 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other. If there is RRC connection between a user equipment and an RRC layer of a network, the user equipment is in an RRC connected mode. Otherwise, the user equipment is in an RRC idle mode. A NAS (non-access stratum) layer, which is located at the top of the RRC layer, performs such a function as session management and mobility management.

One cell constituting a base station (eNB) is set to one of bandwidths of 1.4, 3.5, 5, 10, 15, and 20 MHz and provides a downlink or uplink transmission service to several user equipments. At this time, different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH). Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 3:
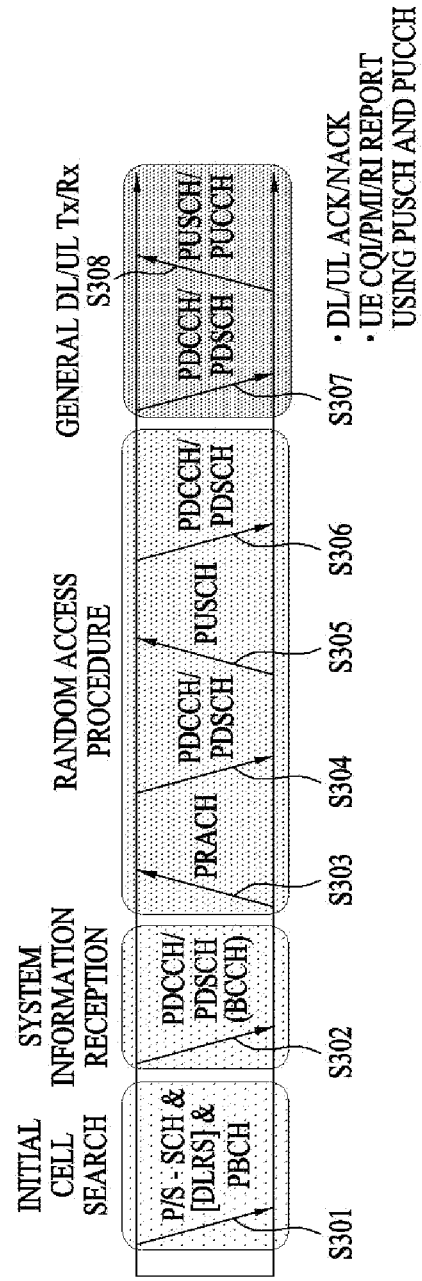
FIG. 3 is a diagram illustrating physical channels used in a 3GPP LTE system and a general method for transmitting a signal using the physical channels.

FIG. 3 is a diagram showing physical channels used in a 3GPP system and a general signal transmission method using the same.

When a UE is powered on or enters a new cell, the UE performs an initial cell search operation such as synchronization with an eNB (S301). To this end, the UE may receive a primary synchronization channel (P-SCH) and a secondary synchronization channel (S-SCH) from the eNB to perform synchronization with the eNB and acquire information such as a cell ID. Then, the UE may receive a physical broadcast channel from the eNB to acquire broadcast information in the cell. During the initial cell search operation, the UE may receive a downlink reference signal (DL RS) so as to confirm a downlink channel state.

After the initial cell search operation, the UE may receive a physical downlink control channel (PDCCH) and a physical downlink control channel (PDSCH) based on information included in the PDCCH to acquire more detailed system information (S302).

When the UE initially accesses the eNB or has no radio resources for signal transmission, the UE may perform a random access procedure (RACH) with respect to the eNB (steps S303 to S306). To this end, the UE may transmit a specific sequence as a preamble through a physical random access channel (PRACH) (S303 and S305) and receive a response message to the preamble through the PDCCH and the PDSCH corresponding thereto (S304 and S306). In the case of contention-based RACH, the UE may further perform a contention resolution procedure.

After the above procedure, the UE may receive PDCCH/PDSCH from the eNB (S407) and may transmit a physical uplink shared channel (PUSCH)/physical uplink control channel (PUCCH) to the eNB (S308), which is a general uplink/downlink signal transmission procedure. Particularly, the UE receives downlink control information (DCI) through the PDCCH. Here, the DCI includes control information such as resource allocation information for the UE. Different DCI formats are defined according to different usages of DCI.

Control information transmitted from the UE to the eNB in uplink or transmitted from the eNB to the UE in downlink includes a downlink/uplink acknowledge/negative acknowledge (ACK/NACK) signal, a channel quality indicator (CQI), a precoding matrix index (PMI), a rank indicator (RI), and the like. In the case of the 3GPP LTE system, the UE may transmit the control information such as CQI/PMI/RI through the PUSCH and/or the PUCCH.

Figure 4:
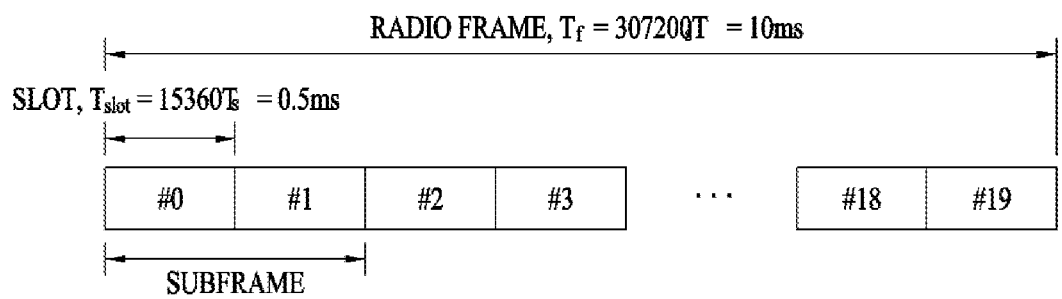
FIG. 4 is a diagram illustrating a structure of a radio frame used in an LTE system.

FIG. 4 is a diagram for a structure of a radio frame used in an LTE system.

Referring to FIG. 4, one radio frame has a length of 10 ms (327,200×$T_S$) and is constructed with 10 subframes in equal size. Each of the subframes has a length of 1 ms and is constructed with two slots. Each of the slots has a length of 0.5 ms (15,360×$T_S$). In this case, $T_S$ indicates a sampling time and is represented as $T_S$=1/(15 kHz 2048)=3.2552× $10^{-8}$ (i.e., about 33 ns). The slot includes a plurality of OFDM symbols in a time domain and also includes a plurality of resource blocks (RBs) in a frequency domain. In the LTE system, one resource block includes '12 subcarriers×7 or 6 OFDM symbols'. A transmission time interval (TTI), which is a unit time for transmitting data, can be determined by at least one subframe unit. The aforementioned structure of a radio frame is just exemplary. And, the number of subframes included in a radio frame, the number of slots included in a subframe and the number of OFDM symbols included in a slot may be modified in various ways.

Figure 5:
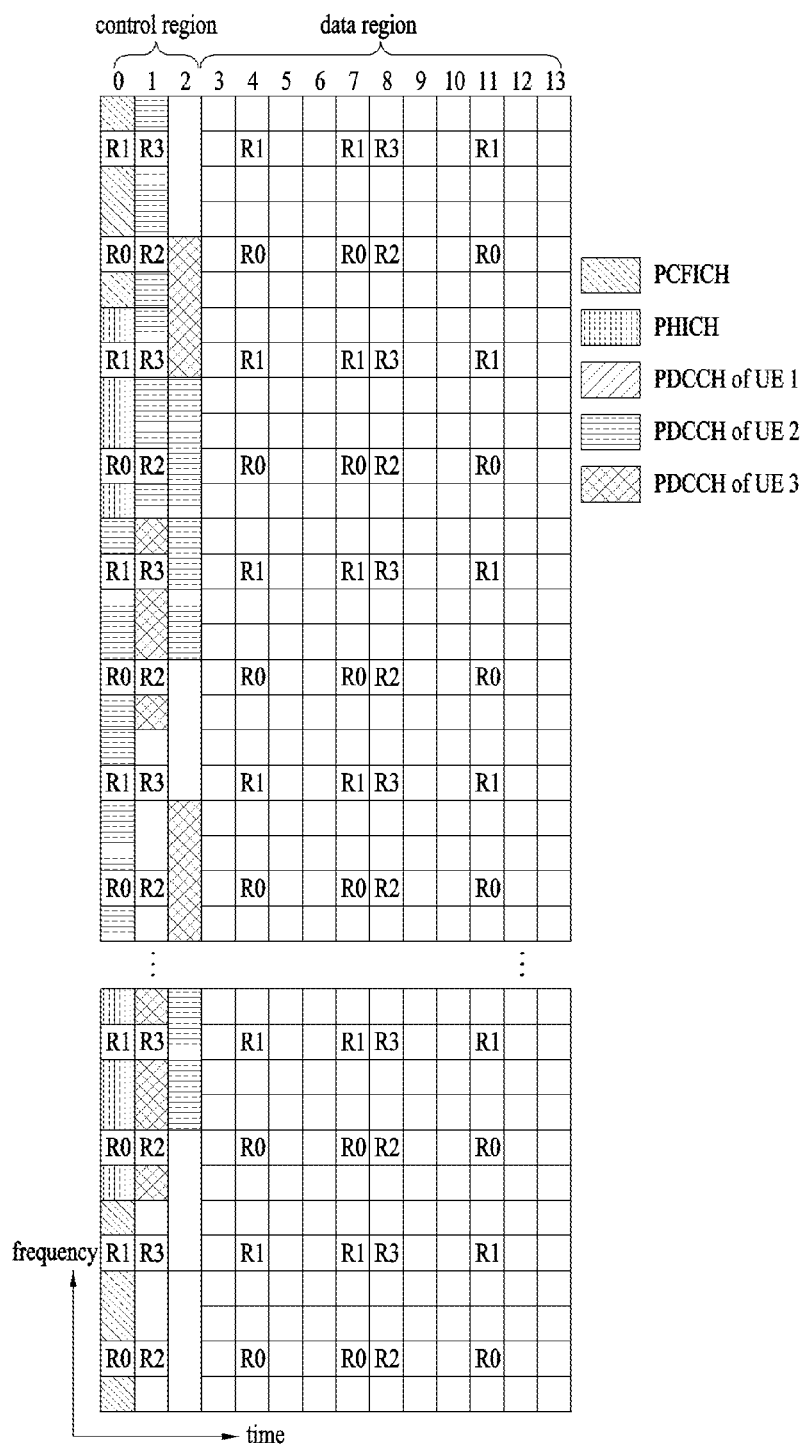
FIG. 5 is a diagram illustrating a structure of a downlink radio frame used in an LTE system.

FIG. 5 illustrates exemplary control channels included in a control region of a subframe in a DL radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In FIG. 5, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH includes 4 Resource Element Groups (REGs), each REG being distributed to the control region based on a cell Identifier (ID). One REG includes 4 Resource Elements (REs). An RE is a minimum physical resource defined by one subcarrier by one OFDM symbol. The PCFICH is set to 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for a UL transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical DL control channel allocated to the first n OFDM symbols of a subframe. Herein, n is 1 or a larger integer indicated by the PCFICH. The PDCCH occupies one or more CCEs. The PDCCH carries resource allocation information about transport channels, PCH and DL-SCH, a UL scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating one or more UEs to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
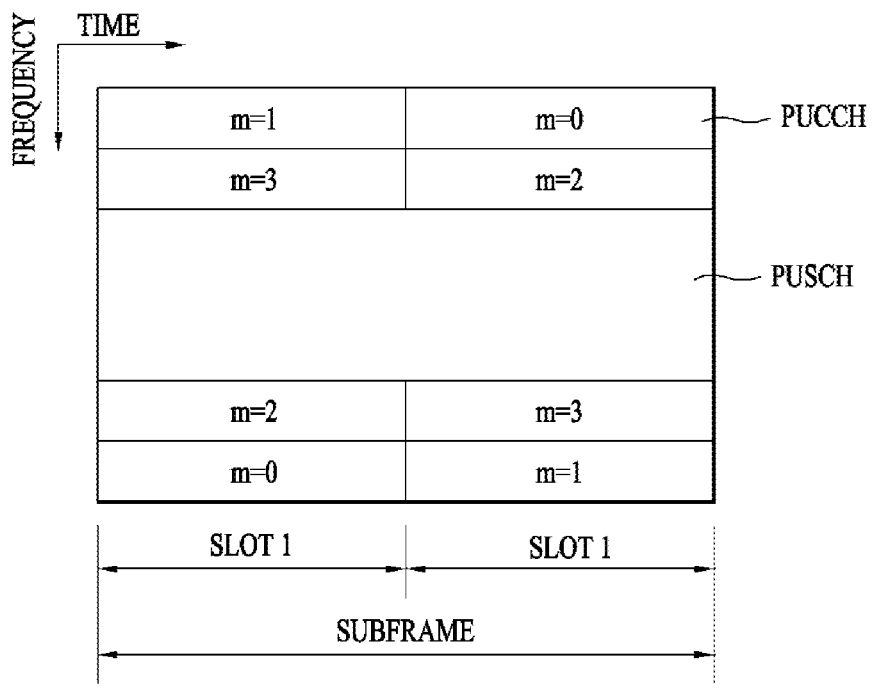
FIG. 6 is a diagram illustrating a structure of an uplink subframe used in an LTE system.

FIG. 6 illustrates a structure of a UL subframe in the LTE system.

Referring to FIG. 6, a UL subframe may be divided into a control region and a data region. A Physical Uplink Control Channel (PUCCH) including Uplink Control Information (UCI) is allocated to the control region and a Physical uplink Shared Channel (PUSCH) including user data is allocated to the data region. The middle of the subframe is allocated to the PUSCH, while both sides of the data region in the frequency domain are allocated to the PUCCH. Control information transmitted on the PUCCH may include an HARQ ACK/NACK, a CQI representing a downlink channel state, an RI for MIMO, a Scheduling Request (SR) requesting UL resource allocation. A PUCCH for one UE occupies one RB in each slot of a subframe. That is, the two RBs allocated to the PUCCH are frequency-hopped over the slot boundary of the subframe. Particularly, PUCCHs with m=0, m=1, m=2, and m=3 are allocated to a subframe in FIG. 6.

Figure 7:
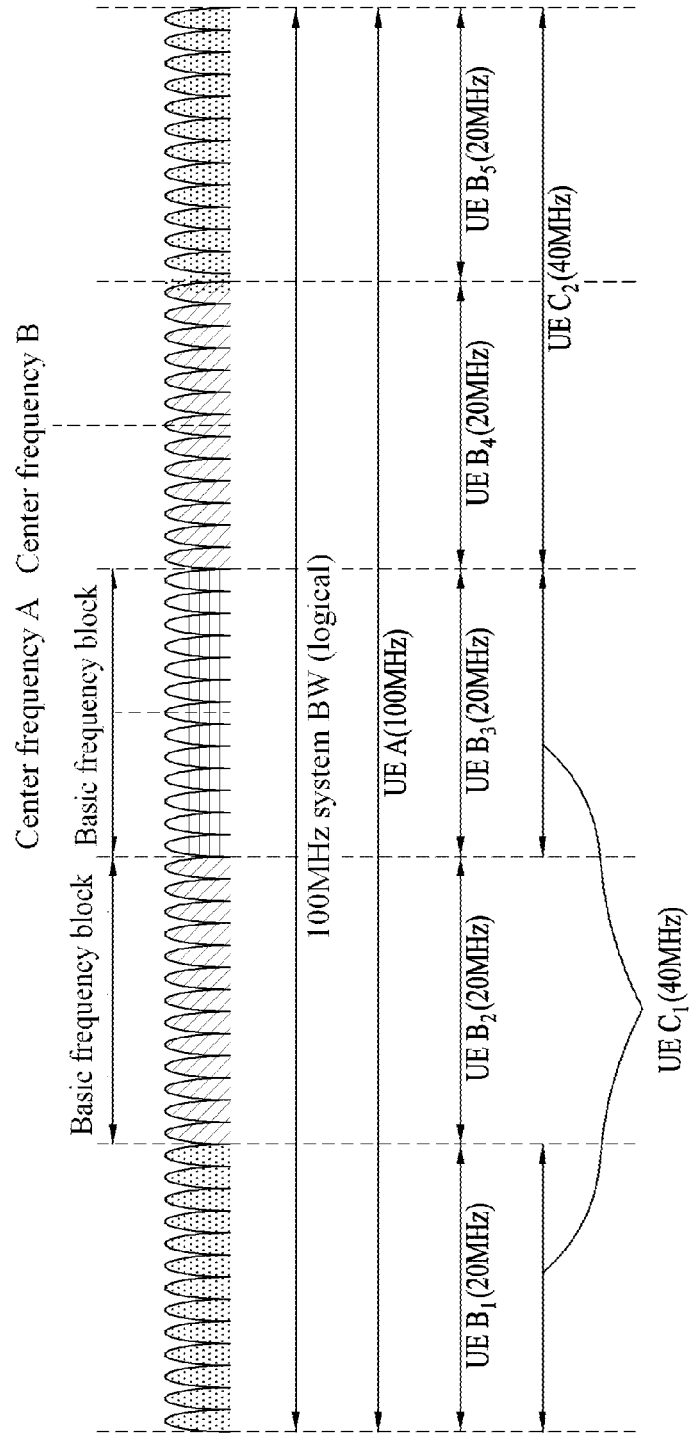
FIG. 7 is a conceptual diagram for explaining carrier aggregation.

In the following, a carrier aggregation scheme is described. FIG. 7 is a conceptual diagram for explaining carrier aggregation.

The carrier aggregation refers to a method of using a plurality of frequency blocks or (logical) cells including uplink resources (or component carriers) and/or downlink resources (or component carriers) by a UE as one large logical frequency band in order to use a wider frequency band by a wireless communication system. Hereinafter, for convenience of description, the term 'component carrier' is consistently used.

Referring to FIG. 7, a system bandwidth (system BW) has a maximum of 100 MHz as a logical bandwidth. The system BW includes five component carriers. Each component carrier has a maximum of 20 MHz of bandwidth. A component carrier includes one or more physically consecutive subcarriers. Although FIG. 7 illustrates the case in which component carriers have the same bandwidth, the case is purely exemplary, and thus, the component carriers may have different bandwidths. In addition, although FIG. 7 illustrates the case in which the component carriers are adjacent to each other in the frequency domain, FIG. 7 are logically illustrated, and thus, the component carriers may be physically adjacent to each other or may be spaced apart from each other.

Component carriers can use different center frequencies or use one common center frequency with respect to physically adjacent component carriers. For example, in FIG. 7, assuming all component carriers are physically adjacent to each other, center frequency A may be used. In addition, assuming that component carriers are not physically adjacent to each other, center frequency A, center frequency B, etc. may be used with respect to the respective component carriers.

Throughout this specification, a component carrier may correspond to a system band of a legacy system. The component carrier is defined based on a legacy system, and thus, it can be easy to provide backward compatibility and to design the system in a wireless communication environment in which an evolved UE and a legacy UE coexist. For example, when an LTE-A system supports carrier aggregation, each component carrier may corresponds to a system band of an LTE system. In this case, the component carrier may have any one of bandwidths of 1.25, 2.5, 5, 10, and 20 Mhz.

When a system band is extended via carrier aggregation, a frequency band used for communication with each UE is defined in a component carrier unit. UE A may use 100 MHz as a system band and perform communication using all five component carriers. UEs $B_1$ to $B_5$ can use only a bandwidth of 20 MHz and perform communication using one component carrier. UEs $C_1$ and $C_2$ can use a bandwidth of 40 MHz and communication using two component carries. The two component carriers may or may not be logically/physically adjacent to each other. UE $C_1$ refers to the case in which two component carriers that are not adjacent to each other are used and UE $C_2$ refers to the case in which two adjacent component carriers are used.

Figure 8:
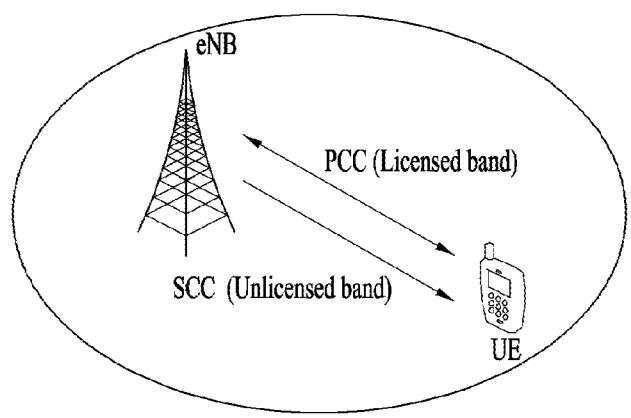
FIG. 8 is a diagram for an example of a carrier aggregation situation of a licensed band and an unlicensed band.

An LTE system may use one downlink component carrier and one uplink component carrier, whereas an LTE-A system may use a plurality of component carriers as illustrated in FIG. 8. A downlink component carrier or a combination of the downlink component carrier and a uplink component carrier corresponding to the downlink component carrier may be referred to as a cell. A corresponding relation between a downlink component carrier and an uplink component carrier can be indicated via system information.

In this case, a method for scheduling a data channel by a control channel may be classified into a linked carrier scheduling method and a cross carrier scheduling method.

More specifically, in the linked carrier scheduling method, a control channel transmitted through a specific component carrier schedules only a data channel through the specific component carrier like in a legacy LTE system using a single component carrier. In particular, a downlink grant/uplink grant transmitted to PDCCH region of a downlink component carrier of the specific component carrier (or specific cell) can schedule only PDSCH/PUSCH of a cell to which the downlink component carrier belongs thereto. In particular, a search space corresponding to a region for attempting to detect the downlink grant/uplink grant exists at a PDCCH region of a cell at which PDSCH/PUSCH corresponding to a scheduling target is located.

Meanwhile, in the cross carrier scheduling method, a control channel transmitted through a primary component carrier (primary CC) using a carrier indicator field (CIF) schedules a data channel transmitted through the primary CC or a different CC. In other word, in the cross carrier scheduling method, a monitored cell (or a monitored CC) is set and a downlink grant/uplink grant transmitted in PDCCH region of the monitored cell schedules PDSCH/PUSCH of a cell configured to be scheduled in the cell. In particular, a search space for a plurality of component carriers exists at PDCCH region of the monitored cell. The Pcell is set among a plurality of the cells to transmit system information, attempt initial access, and transmit uplink control information. The Pcell includes downlink primary component carrier and an uplink primary component carrier corresponding to the downlink primary component carrier.

In the following, a method of transmitting and receiving a signal through an unlicensed band is explained.

FIG. 8 is a diagram for an example of a carrier aggregation situation of a licensed band and an unlicensed band.

Referring to FIG. 8, an eNB can transmit a signal to a UE or the UE can transmit a signal to the eNB in a carrier aggregation situation of an LTE-A band corresponding to a licensed band and an unlicensed band. In the following description, for clarity, assume that the UE is configured to perform wireless communication through two component carriers in the licensed band and the unlicensed band, respectively. In this case, a carrier of the licensed band corresponds to a primary component carrier (primary CC (PCC) or Pcell) and a carrier of the unlicensed band corresponds to a secondary component carrier (secondary CC (SCC) or Scell). Yet, methods proposed by the present invention can also be extensively applied to a situation that a plurality of licensed bands and a plurality of unlicensed bands are used via carrier aggregation scheme. And, the methods can also be applied to a case that a signal is transceived between an eNB and a UE via an unlicensed band only.

First of all, a general resource mapping scheme is explained before the present invention is explained. In an OFDM-based system, a method of mapping a final modulation symbol stream $x_0, x_1, \ldots, x_{A-1}$ (in this case, A corresponds to the total number of modulation symbols), which is obtained via channel coding and modulation process, to a time/frequency resource having an RE (resource element) as a minimum unit can be divided into time-first mapping and frequency-first mapping.

Figure 9:
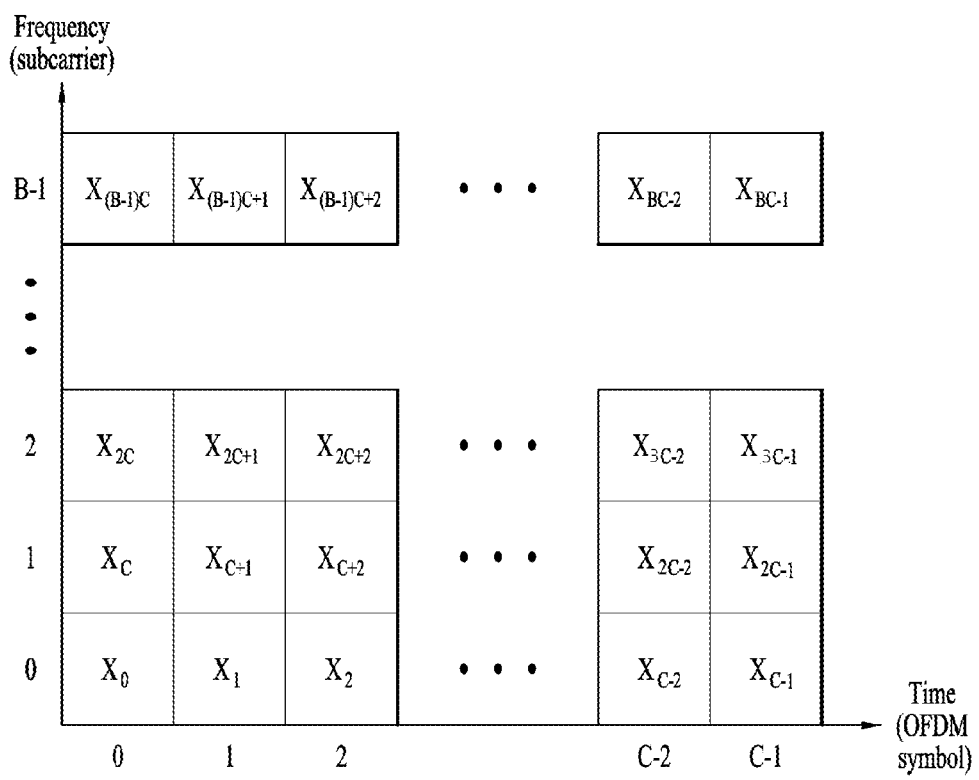
FIG. 9 is a diagram for an example of a time-first mapping scheme.

FIG. 9 is a diagram for an example of a time-first mapping scheme.

Referring to FIG. 9, first of all, the time-first mapping sequentially maps OFDM symbols from a first OFDM symbol to the last OFDM symbol at a frequency position having a minimum index among frequencies allocated as a transmission resource, moves to a next frequency index, and repeats a process of mapping a next modulation symbol.

In FIG. 9, assume that the number of subcarriers allocated for transmitting a signal and the number of OFDM symbols correspond to B and C, respectively. For clarity, it is assumed a case that all REs can be used for transmitting a symbol stream. If a partial RE is used for transmitting such a different signal as an RS (reference signal), a symbol stream is mapped to the remaining REs only except the RE. As a result, the total number of REs B*C allocated to transmit a signal becomes identical to the total number of transmission symbols A.

Figure 10:
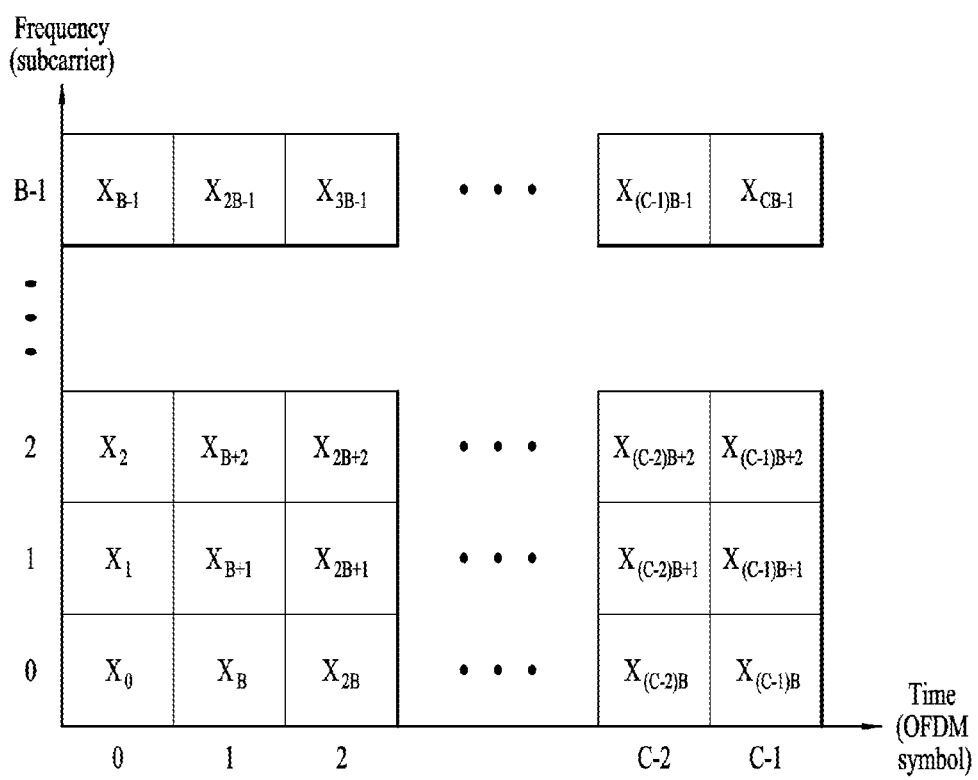
FIG. 10 is a diagram for an example of a frequency-first mapping scheme.

FIG. 10 is a diagram for an example of a frequency-first mapping scheme.

Referring to FIG. 10, frequency-first mapping firstly performs mapping on a subcarrier existing on an OFDM symbol of a minimum index. If all subcarriers of the OFDM symbol are used, mapping is repeated by moving to a next OFDM symbol.

In a current LTE system, PDSCH uses the frequency-first mapping and PUSCH uses the time-first mapping. Yet, in case of the PUSCH, all modulation symbols transmitted to the same OFDM symbol are linearly combined via DFT-precoding after resource mapping and transmitted in each subcarrier. This can be interpreted that time-first mapping is performed by considering a subcarrier at the time of performing resource mapping as a logical subcarrier index.

If the frequency-first mapping currently used in LTE PDSCH is used in an unlicensed band as it is, performance can be degraded. This is because not only LTE system but also a system of a different type such as WiFi or Bluetooth may exist in the unlicensed band and the LTE system should transmit and receive a signal via channel contention with the various systems. In general, although dispersive channel contention is used, it is impossible to perfectly prevent a resource collision which is occurred when two transmitting ends transmit a signal at the same time. Hence, a transmission signal of a system may have strong interference from a transmission signal of another system with at least a constant probability.

In particular, LTE system basically performs resource allocation in a unit of a subframe of 1 ms length as a minimum unit of the resource allocation, whereas WiFi or Bluetooth frequently transmits a signal of a length much shorter than the minimum unit. Hence, PDSCH, which is transmitted in a unit of subframe of 1 ms in an unlicensed, experiences strong interference in a specific OFDM symbol only. On the contrary, the PDSCH may frequently experiences low interference in other OFDM symbols.

Figure 11:
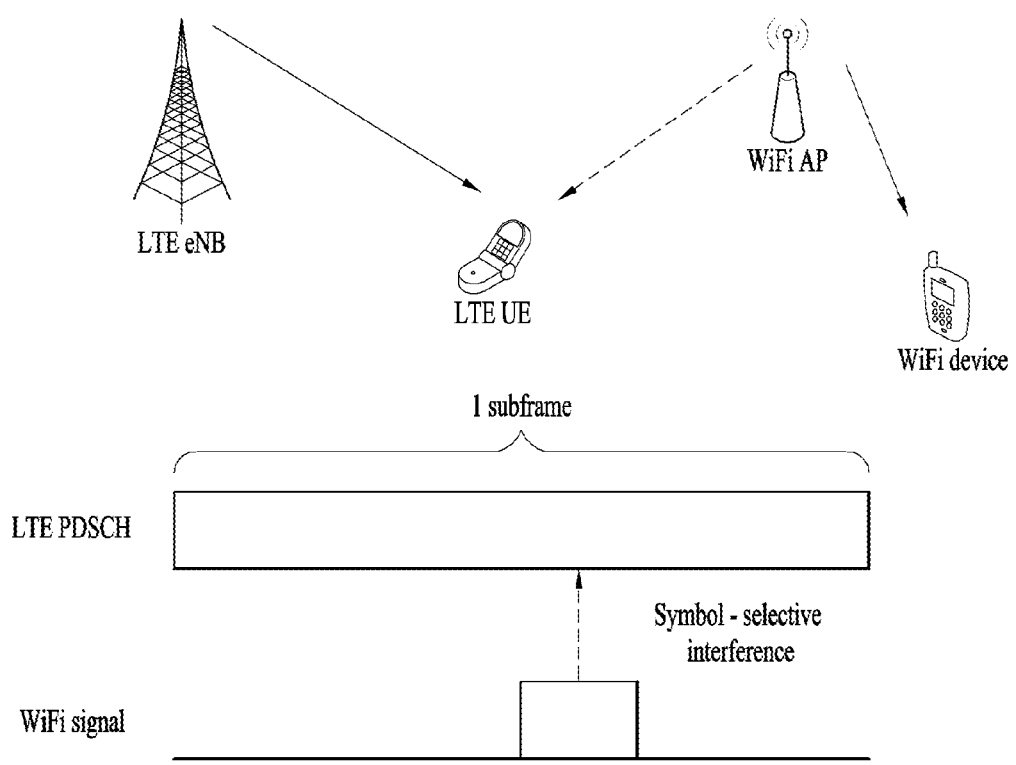
FIG. 11 is a diagram for an example of symbol-selective interference occurred in an unlicensed band.

FIG. 11 is a diagram for an example of symbol-selective interference occurred in an unlicensed band.

The symbol-selective interference illustrated in FIG. 11 may become a more serious problem when code block segmentation occurs due to the large size of data to be transmitted through legacy LTE PDSCH. When the data size exceeds a certain level, a bit stream to be transmitted through PDSCH is divided into a plurality of code blocks, and channel coding and CRC (cyclic redundancy check) are applied according to each code block. If a UE fails to receive any of a plurality of the code blocks included in one PDSCH, the UE reports NACK to an eNB and to make all code blocks to be retransmitted. Regarding this, it shall be described with reference to the drawing.

Figure 12:
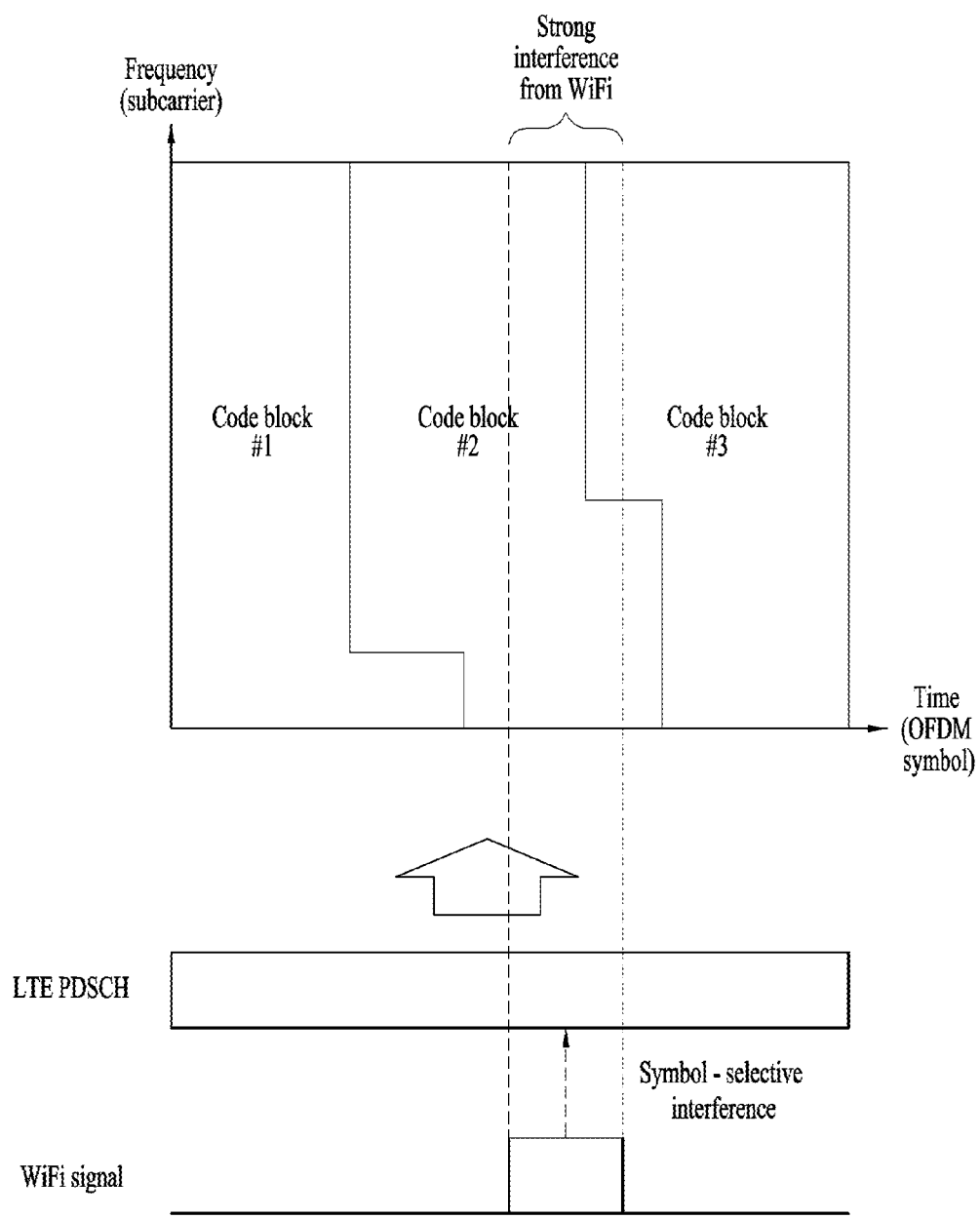
FIG. 12 is a diagram for an example of symbol-selective interference intensively occurred at a specific code block.

FIG. 12 is a diagram for an example of symbol-selective interference intensively occurred at a specific code block.

Referring to FIG. 12, there is a possibility that only a specific code block is intensively exposed to symbol-selective interference in an unlicensed band due to the frequency-first mapping of the legacy LTE PDSCH. As a result, although the remaining code blocks are correctly received, all code blocks are retransmitted, thereby causing resource waste. In particular, a code block #2 is intensively exposed to strong interference, decoding fails with a very high probability, and the remaining code blocks are retransmitted irrespective of whether or not the code blocks are successfully received.

In order to solve the above problem, the present invention proposes to apply time-first mapping to PDSCH transmitted from an eNB to a UE in an unlicensed band.

Figure 13:
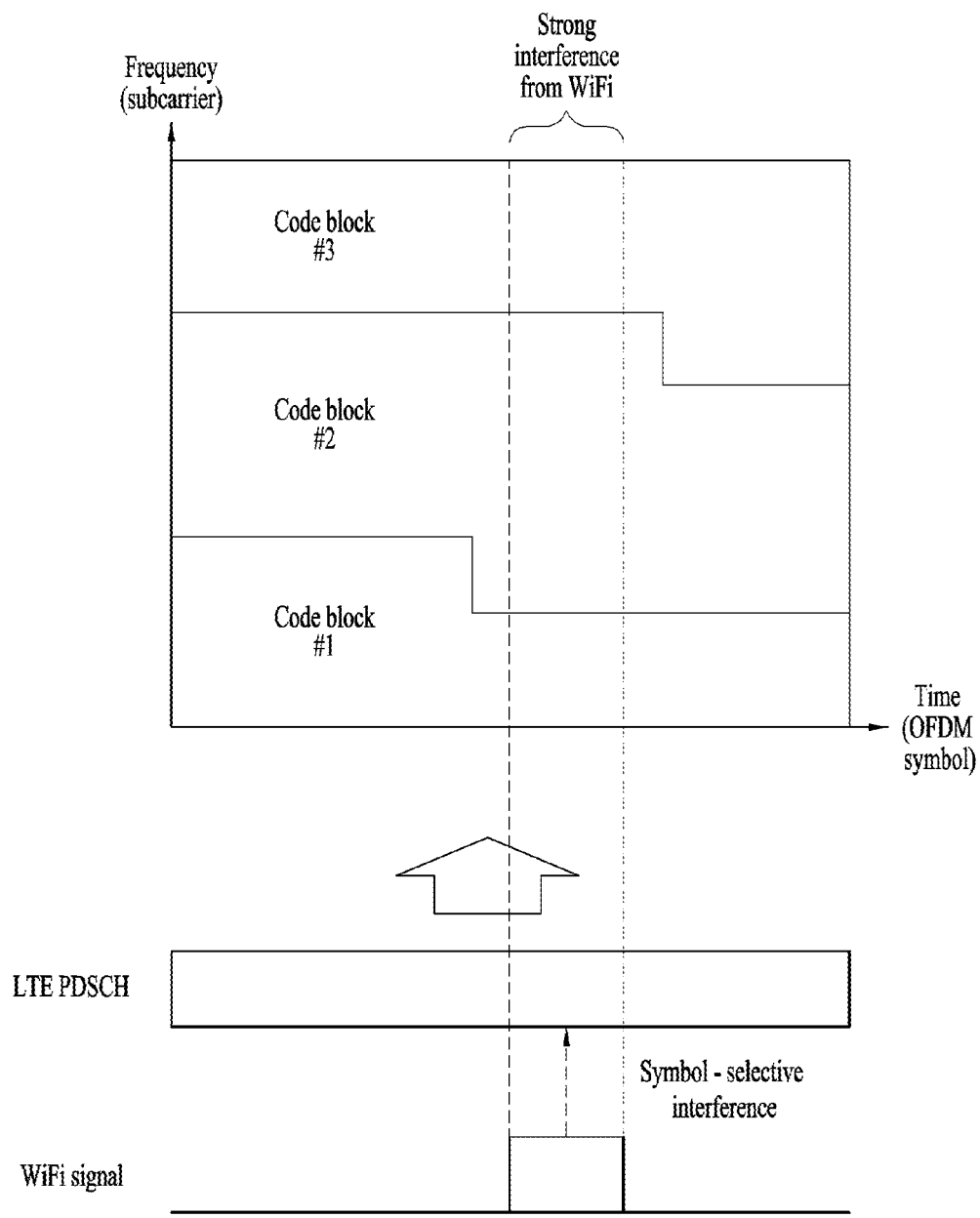
FIG. 13 is a diagram for an example of applying time-first mapping to PDSCH in an unlicensed band according to embodiment of the present invention.

FIG. 13 is a diagram for an example of applying time-first mapping to PDSCH in an unlicensed band according to embodiment of the present invention. When interference identical to the interference of FIG. 12 is applied, if time-first mapping is performed, code blocks are mapped as shown in FIG. 13. As a result, symbol-selective interference is uniformly distributed to all code blocks. Hence, it may be able to minimize a case that only a specific code block is intensively exposed to interference.

As a result, PDSCH of LTE has two types of resource mapping schemes. As an example, when operating in a specific band such as an unlicensed band, it may regulate to use time-first mapping or it may regulate to use the time-first mapping when a series of processes (e.g., a process of transmitting an RS only when the continuous RS transmission of the eNB is not guaranteed and a channel is idle) for operations in the unlicensed band is set. Or, it may be able to make the eNB designate a PDSCH resource mapping scheme to be used on each component carrier to provide more degrees of freedom to the eNB.

However, since it is effective to apply PDSCH of new time-first mapping to PDSCH of a large capacity only, PDSCH, which is scheduled by PDCCH of a CSS (common search space) mainly used for supporting relatively small capacity, uses the legacy frequency-first mapping in a fallback situation that a connection state between an eNB and a UE is uncertain. On the contrary, PDSCH, which is scheduled by PDCCH of a USS (UE-specific search space), may use the time-first mapping according to the aforementioned description.

As an alternative for the use of the time-first mapping, a separate additional interleaving process can be performed after a code block concatenating process for connecting a plurality of code blocks with each other. In a bit stream corresponding to an output of the separate additional interleaving process, two adjacent bits may become bits belonging to code blocks different from each other (with a very high probability). Regarding this, it shall be described in the following with reference to drawings.

Figure 14:
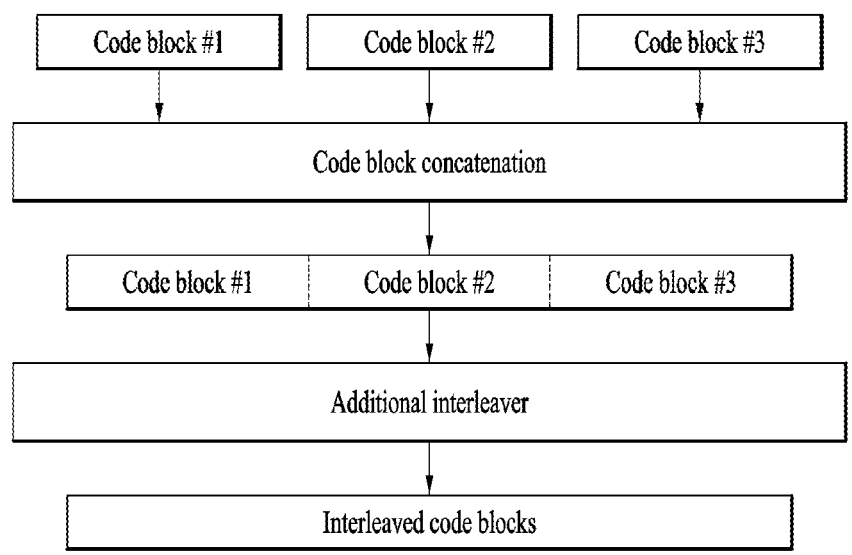
FIG. 14 is a diagram for an example of applying additional interleaving to PDSCH in an unlicensed band according to embodiment of the present invention.

FIG. 14 is a diagram for an example of applying additional interleaving to PDSCH in an unlicensed band according to embodiment of the present invention.

Referring to FIG. 14, it is able to see that a separate additional interleaving process is performed after a code block concatenation process for connecting the plurality of code blocks. Hence, although frequency-first mapping is sequentially performed on a modulation symbol stream $\{x_0, x_1, \ldots, x_{A-1}\}$, which is obtained by the additional interleaving process, since a modulation symbol originated from a plurality of the code blocks is mapped to a specific OFDM symbol, a possibility that only a specific code block is intensively exposed to interference becomes very low even in a symbol-selective interference situation.

As a different method capable of obtaining an effect similar to the effect of the process of adding interleaving after code block concatenation, when code blocks are concatenated, it is able to modify a code block concatenation operation in a manner that one or more bits are brought while alternating each code block in sequence instead of connecting code blocks according to a code block. As a further different method, while the legacy code block concatenation is performed as it is, it may change an order of OFDM symbols, which is used for frequency-first mapping, to map a code block to an OFDM symbol far from the code block.

Figure 15:
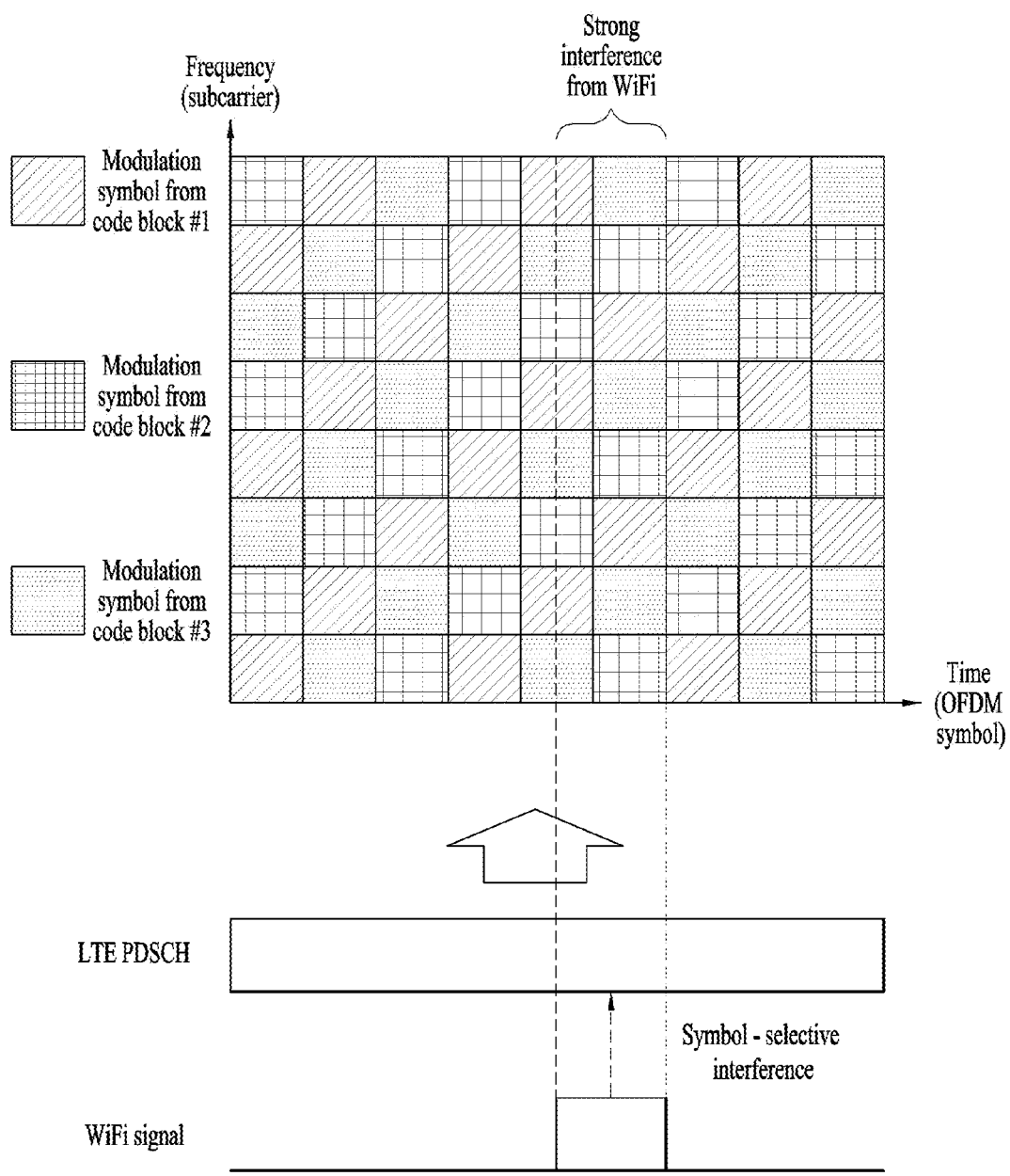
FIG. 15 is a diagram for a result of applying additional interleaving to PDSCH in an unlicensed band according to embodiment of the present invention.

FIG. 15 is a diagram for a result of applying additional interleaving to PDSCH in an unlicensed band according to embodiment of the present invention. Referring to FIG. 15, it is able to see that modulation symbols of a plurality of code blocks are mapped to an OFDM symbol via an additional interleaving process.

In the following, as mentioned in the foregoing description, when a PDSCH mapping scheme (hereinafter, enhanced PDSCH mapping scheme) performing additional interleaving process is applied while the time-first mapping is applied or the frequency-first mapping is maintained, a problem of PDSCH decoding time of a UE is explained and a solution for the problem is proposed.

If the enhanced PDSCH mapping is applied to PDSCH, PDSCH decoding time budget of a UE may become shorter compared to a legacy PDSCH. In case of the frequency-first mapping shown in FIG. 12, since a UE receives all modulation symbols necessary for decoding a code block #1 before reception of a corresponding subframe is completed. Hence, the UE may initiate decoding of the code block #1 in the middle of receiving a modulation symbol of a different code block.

On the contrary, as shown in FIG. 13, if the time-first mapping is used, decoding on an individual code block is enabled only when all signals of a corresponding subframe are received. Hence, a UE should decode a plurality of code blocks at the same time. As a result, time necessary for decoding all code blocks is more reduced. In case of applying additional interleaving, since a modulation symbol of a code block is distributed to all OFDM symbols due to an interleaving effect, a same phenomenon occurs.

As a method for solving the aforementioned problem, it may delay HARQ-ACK transmission timing of PDSCH to which the enhanced PDSCH mapping is applied. As an example, in a legacy LTE system following HARQ timeline of FDD system, HARQ-ACK for PDSCH, which is received in a subframe #n, is reported in a subframe #n+4. In case of PDSCH to which the enhanced PDSCH mapping is applied, it may be able to regulate HARQ-ACK to be transmitted in a subframe #n+5 or later in response to the PDSCH to provide more decoding time.

As a different method, when the enhanced PDSCH mapping is applied, it may set an upper limit to timing advance applied to a UE. Regarding this, it shall be described with reference to the drawing.

Figure 16:
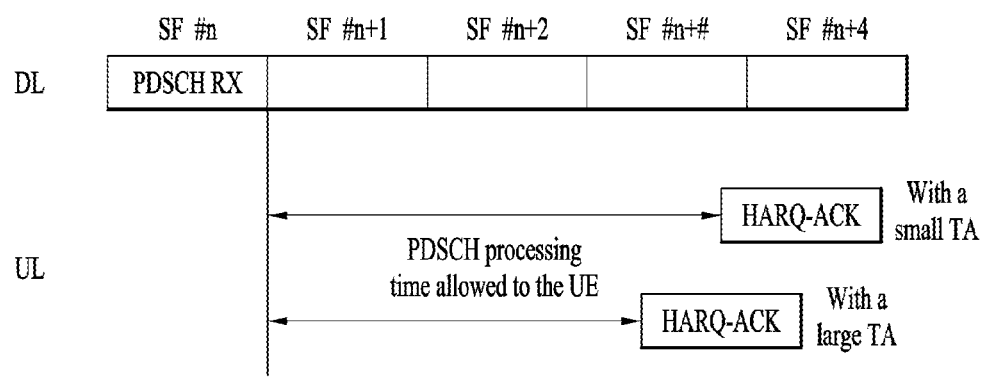
FIG. 16 is a diagram for an example of a problem capable of being occurred when enhanced PDSCH mapping is applied according to embodiment of the present invention.

FIG. 16 is a diagram for an example of a problem capable of being occurred when enhanced PDSCH mapping is applied according to embodiment of the present invention.

Referring to FIG. 16, an HARQ-ACK signal is transmitted in UL and a timing advance value indicated by an eNB is applied to an uplink signal. As shown in FIG. 16, if a bigger timing advance is applied, HARQ-ACK transmission initiation timing appears early and time permitted for decoding PDSCH is more reduced. Hence, when the enhanced PDSCH mapping is applied, it may be able to configure timing advance applied by a UE to be equal to or less than a prescribed level. By doing so, it may be able to prevent an excessively large timing advance from being applied and prevent a case that time sufficient enough for decoding PDSCH is not provided.

As an example, if a timing advance equal to or less than a prescribed level is applied, a UE should successfully perform decoding on PDSCH to which the enhanced PDSCH mapping is applied. On the contrary, if a timing advance greater than the prescribed level is applied, the UE may not perform decoding on PDSCH to which the enhanced PDSCH mapping is applied. In particular, in case of performing an operation in an unlicensed band where guarantee for interference is not secured, it is natural that a cell radius is restricted. Hence, the method causes a restriction on a UE operation only in a situation of an excessive timing advance in unlicensed band, it is able to simplify implementation of a UE without decreasing actual performance. If a UE, which have reported sufficiently high CQI to an eNB, fails to successfully decode PDSCH, the eNB is able to know that the timing advance of the UE is greater than the prescribed level.

As a different method, when the enhanced PDSCH mapping is used, a size of PDSCH, i.e., the number of bits transmitted through PDSCH can be restricted to be equal to or lower than a prescribe level. Since it takes more time for decoding larger PDSCH, when the enhanced PDSCH mapping is used, if a maximum value of the PDSCH size is appropriately configured, the aforementioned problem can be solved.

The aforementioned methods can be applied in a manner of being combined with each other. For example, when the enhanced PDSCH mapping is applied, if the PDSCH size is equal to or less than a prescribed level, since there is no problem in decoding time, a restriction does not occur on timing advance. On the contrary, if the PDSCH size is greater than the prescribed level, since a problem occurs on decoding time for excessive timing advance, an upper limit is applied to the timing advance. If timing advance is greater than the upper limit, it may be able to configure a UE not to decode the PDSCH of the size greater than the prescribed level.

Meanwhile, the enhanced PDSCH mapping can be selectively applied only when the number of code blocks constructing PDSCH is equal to or greater than a prescribed level. If a PDSCH consists of a single code block, although the enhanced PDSCH mapping is not used, a systematic bit and a parity bit are mapped to each OFDM symbol in a manner of being appropriately mixed through an interleaving process per code block already included in the legacy processing process. In this case, if additional interleaving or time-first mapping is applied, it offsets an effect of the interleaving per code block and the systematic bit, which plays a more important part in a decoding process, is intensively mapped to a specific OFDM symbol again. As a result, performance deterioration due to symbol-selective interference may increase. In order to prevent this, as an example, if the number of code blocks constructing a PDSCH corresponds to two or more, it may use the enhanced PDSCH mapping. Otherwise, it may be able to apply the legacy PDSCH mapping as it is.

As a different method capable of solving the aforementioned symbol-selective interference or the interference per code block, when HARQ-ACK is generated in response to PDSCH, it may be able to divide a plurality of code blocks belonging to a single codeword into a plurality of code block groups and generate ACK/NACK according to each of a plurality of the code block groups instead of the legacy method that ACK/NACK of one bit is generated for all code blocks belonging to a codeword. When ACK/NACK is generated according to a code block group, if all code blocks belonging to the code block group are successfully decoded, ACK is generated. If decoding fails in at least one code block, NACK is generated.

Meanwhile, according to the legacy LTE PDSCH, when multi-layer transmission is performed using multiple transmission and reception antennas, if a rank of PDSCH is equal to or greater than 2, a PDSCH consists of two codewords and a separate HARQ-ACK is generated for each of the codewords. The legacy method can be extensively applied in the present invention. When PDSCH is transmitted by rank 1 in an unlicensed band and one codeword is generated according to the legacy PDSCH generation scheme, if the one codeword includes code blocks more than a prescribed number, two code block groups are generated and it may be able to generate one HARQ-ACK for each of the two code block groups. In particular, it may be able to generate two HARQ-ACKs in total.

A process for a UE to make a feedback on the HARQ-ACK to an eNB can be performed in a manner of being similar to a process of receiving PDSCH of rank 2 or higher and making a feedback on 2 HARQ-ACKs. If the PDSCH maintains frequency first mapping, since it is highly probable that a code block adjacent to the PDSCH experiences similar interference, it is preferable to bind code blocks adjacent to each other in mapping order as a code block group. Of course, the aforementioned operation can be applied only when PDSCH transmitted in an unlicensed band is divided into code blocks more than a prescribed number (e.g., when the number of bits transmitted on PDSCH is equal to or greater than a prescribed number only). Hence, if the number of code blocks is small, it may be able to transmit a single HARQ-ACK only to enhance reliability of HARQ-ACK feedback. Or, an eNB may indicate the number of code block groups divided from a PDSCH in advance via higher layer signaling.

Or, it may be able to apply a scheme that a UE receives a plurality of PDSCHs via carrier aggregation or the like and reports a plurality of HARQ-ACKs to an eNB in response to a plurality of the PDSCHs at the same time. Under an assumption of rank 1 transmission, when the N number of downlink carriers are set to a UE and the N number of PDSCHs are transmitted to a subframe at the same time, if a downlink subframe and an uplink subframe for HARQ-ACK are in 1:1 relationship, a UE should transmit maximum N number of HARQ-ACKs in an uplink subframe. According to the legacy LTE system, this can be handled by using ACK/NACK bundling, HARQ-ACK channel selection, or PUCCH format 3 for transmitting a plurality of HARQ-ACK bits together by performing channel coding on a plurality of the HARQ-ACK bits. This principle can be applied to the present invention. If a PDSCH is divided into the Gi number of code block groups on a downlink carrier #i, a UE can transmit G=G1+G2+, . . . +GN number of HARQ-ACKs in a subframe. As an example, in case of using PUCCH format 3, the generated G number of HARQ-ACK bits are passing through one channel coding and transmitted to an eNB through a given resource.

Figure 17:
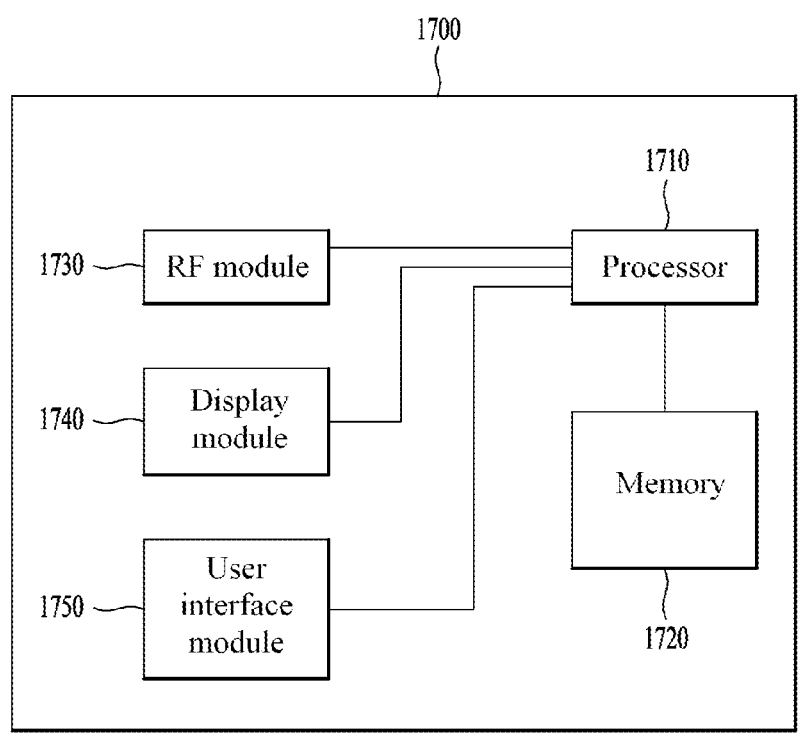
FIG. 17 is a block diagram for a communication device according to one embodiment of the present invention.

FIG. 17 is a block diagram for a communication device according to one embodiment of the present invention.

Referring to FIG. 17, a communication apparatus 1700 includes a processor 1710, a memory 1720, an RF module 1730, a display module 1740, and a User Interface (UI) module 1750.

The communication device 1700 is shown as having the configuration illustrated in FIG. 17, for the convenience of description. Some modules may be added to or omitted from the communication apparatus 1700. In addition, a module of the communication apparatus 1700 may be divided into more modules. The processor 1710 is configured to perform operations according to the embodiments of the present invention described before with reference to the drawings. Specifically, for detailed operations of the processor 1710, the descriptions of FIGS. 1 to 16 may be referred to.

The memory 1720 is connected to the processor 1710 and stores an Operating System (OS), applications, program codes, data, etc. The RF module 1730, which is connected to the processor 1710, upconverts a baseband signal to an RF signal or downconverts an RF signal to a baseband signal. For this purpose, the RF module 1730 performs digital-to-analog conversion, amplification, filtering, and frequency upconversion or performs these processes reversely. The display module 1740 is connected to the processor 1710 and displays various types of information. The display module 1640 may be configured as, not limited to, a known component such as a Liquid Crystal Display (LCD), a Light Emitting Diode (LED) display, and an Organic Light Emitting Diode (OLED) display. The UI module 1750 is connected to the processor 1710 and may be configured with a combination of known user interfaces such as a keypad, a touch screen, etc.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

A specific operation described as performed by a BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with the term 'fixed station', 'Node B', 'evolved Node B (eNode B or eNB)', 'Access Point (AP)', etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

Although a method of allocating a resource for a control signal of direct device-to-device communication in a wireless communication system and an apparatus therefor are described with reference to examples applied to 3GPP LTE system, it may be applicable to various kinds of wireless communication systems as well as the 3GPP LTE system.

What is claimed is:
1. A method of transmitting a codeword utilizing a licensed band or an unlicensed band by an evolved Node B (eNB) to a user equipment (UE) in a wireless communication system, the method comprising:
dividing the codeword into two or more code blocks;
grouping the two or more code blocks into two or more code block groups;
transmitting, by the eNB to the UE, information regarding a number of the two or more code block groups;
mapping the two or more code blocks to a transmission resource of the licensed band or a transmission resource of the unlicensed band;
transmitting, by the eNB to the UE, a Physical Downlink Shared Channel (PDSCH) comprising the two or more code block groups; and
receiving, by the eNB from the UE, a plurality of Hybrid Automatic Repeat and Request Acknowledgments/Negative-Acknowledgments (HARQ-ACKs/NACKs) based on the number of the two or more code block groups that were transmitted in the PDSCH,
wherein mapping the two or more code blocks comprises:
applying a frequency-first mapping scheme, based on the two or more code blocks being mapped to the transmission resource of the licensed band; and
applying a time-first mapping scheme, based on the two or more code blocks being mapped to the transmission resource of the unlicensed band,
wherein the time-first mapping scheme sequentially maps OFDM symbols from a first OFDM symbol to a last OFDM symbol at a same subcarrier, and repeats mapping at a next subcarrier, and
wherein the frequency-first mapping scheme sequentially maps OFDM symbols from a first subcarrier to a last subcarrier at a same OFDM symbol, and repeats mapping at a next OFDM symbol.
2. The method of claim 1, wherein based on the two or more code blocks being mapped to the transmission resource of the unlicensed band, and based on the size of the codeword being less than a threshold:
the two or more code blocks are mapped to the transmission resource of the unlicensed band using the frequency-first mapping scheme, instead of using the time-first mapping scheme.

3. The method of claim 1, wherein transmitting the information regarding the number of the code block groups is performed via higher-layer signaling.

4. The method of claim 1, wherein receiving the plurality of HARQ-ACKs/NACKs comprises:
receiving an acknowledgement (ACK) for a code block group, among the two or more code block groups, based on the UE correctly decoding all code blocks corresponding to the code block group.

5. A method of receiving a codeword utilizing a licensed band or an unlicensed band by a user equipment (UE) from an evolved Node B (eNB) in a wireless communication system, the method comprising:
receiving, from the eNB, information regarding for a number of two or more code block groups, wherein two or more code blocks are grouped into the two or more code block groups and the codeword is divided into the two or more code blocks;
receiving, from the eNB, a Physical Downlink Shared Channel (PDSCH) comprising the two or more code block groups; and
transmitting, to the eNB, a plurality of Hybrid Automatic Repeat and Request Acknowledgments/Negative-Acknowledgments (HARQ-ACKs/NACKs) based on the number of the two or more code block groups that were received in the PDSCH,
wherein the two or more code blocks are mapped to a transmission resource of the licensed band or a transmission resource of the unlicensed band, and
wherein mapping the two or more code blocks comprises:
based on the two or more code blocks being mapped to the transmission resource of the licensed band, a frequency-first mapping scheme is applied; and
based on the two or more code blocks being mapped to the transmission resource of the unlicensed band, a time-first mapping scheme is applied,
wherein the time-first mapping scheme sequentially maps OFDM symbols from a first OFDM symbol to a last OFDM symbol at a same subcarrier, and repeats mapping at a next subcarrier, and
wherein the frequency-first mapping scheme sequentially maps OFDM symbols from a first subcarrier to a last subcarrier at a same OFDM symbol, and repeats mapping at a next OFDM symbol.

6. The method of claim 5, wherein receiving the PDSCH comprising the two or more code block groups is based on a number of code blocks in each of the two or more code block groups exceeding a threshold.

7. The method of claim 5, wherein receiving the information regarding the number of the code block groups is performed via higher-layer signaling.

8. The method of claim 5, wherein transmitting, to the eNB, the plurality of HARQ-ACKs/NACKs comprises:
transmitting, to the eNB, an acknowledgement (ACK) for a code block group, among the two or more code block groups, based on correctly decoding all code blocks corresponding to the code block group.

9. An evolved Node B (eNB) configured to transmit a codeword utilizing a licensed band or an unlicensed band to a user equipment (UE) in a wireless communication system, the eNB comprising:
at least one transceiver;
at least one processor; and
at least one computer operably connectable to the at least one processor and storing instructions that, when executed by the at least one processor, perform operations comprising:
dividing the codeword into two or more code blocks;
grouping the two or more code blocks into two or more code block groups;
transmitting, by the eNB to the UE, via the at least one transceiver, information regarding a number of the two or more code block groups;
mapping the two or more code blocks to a transmission resource of the licensed band or a transmission resource of the unlicensed band;
transmitting, by the eNB to the UE, via the at least one transceiver, a Physical Downlink Shared Channel (PDSCH) comprising the two or more code block groups; and
receiving, by the eNB from the UE, via the at least one transceiver, a plurality of Hybrid Automatic Repeat and Request Acknowledgments/Negative-Acknowledgments (HARQ-ACKs/NACKs) based on the number of the two or more code block groups that were transmitted in the PDSCH,
wherein mapping the two or more code blocks comprises:
applying a frequency-first mapping scheme, based on the two or more code blocks being mapped to the transmission resource of the licensed band; and
applying a time-first mapping scheme, based on the two or more code blocks being mapped to the transmission resource of the unlicensed band,
wherein the time-first mapping scheme sequentially maps OFDM symbols from a first OFDM symbol to a last OFDM symbol at a same subcarrier, and repeats mapping at a next subcarrier, and
wherein the frequency-first mapping scheme sequentially maps OFDM symbols from a first subcarrier to a last subcarrier at a same OFDM symbol, and repeats mapping at a next OFDM symbol.

10. An apparatus comprising:
at least one processor; and
at least one computer operably connectable to the at least one processor and storing instructions that, when executed by the at least one processor, perform operations comprising:
dividing a codeword into two or more code blocks;
grouping the two or more code blocks into two or more code block groups;
transmitting, by an evolved Node B (eNB) to a user equipment (UE) in a wireless communication system, information regarding a number of the two or more code block groups;
mapping the two or more code blocks to a transmission resource of a licensed band or a transmission resource of an unlicensed band;
transmitting, by the eNB to the UE, a Physical Downlink Shared Channel (PDSCH) comprising the two or more code block groups; and
receiving, by the eNB from the UE, a plurality of Hybrid Automatic Repeat and Request Acknowledgments/Negative-Acknowledgments (HARQ-ACKs/NACKs) based on the number of the two or more code block groups that were transmitted in the PDSCH,
wherein mapping the two or more code blocks comprises:
applying a frequency-first mapping scheme, based on the two or more code blocks being mapped to the transmission resource of the licensed band; and applying a time-first mapping scheme, based on the two or more code blocks being mapped to the transmission resource of the unlicensed band, wherein the time-first mapping scheme sequentially maps OFDM symbols from a first OFDM symbol to a last OFDM symbol at a same subcarrier, and repeats mapping at a next subcarrier, and wherein the frequency-first mapping scheme sequentially maps OFDM symbols from a first subcarrier to a last subcarrier at a same OFDM symbol, and repeats mapping at a next OFDM symbol.

11. A user equipment (UE) configured to receive a codeword utilizing a licensed band or an unlicensed band from an evolved Node B (eNB) in a wireless communication system, the UE comprising:

at least one transceiver;
at least one processor; and
at least one computer operably connectable to the at least one processor and storing instructions that, when executed by the at least one processor, perform operations comprising:

receiving, from the eNB, via the at least one transceiver, information regarding for a number of two or more code block groups, wherein two or more code blocks are grouped into the two or more code block groups and the codeword is divided into the two or more code blocks;

receiving, from the eNB via the at least one transceiver, a Physical Downlink Shared Channel (PDSCH) comprising the two or more code block groups; and transmitting, to the eNB via the at least one transceiver, a plurality of Hybrid Automatic Repeat and Request Acknowledgments/Negative-Acknowledgments (HARQ-ACKs/NACKs) based on the number of the two or more code block groups that were received in the PDSCH, wherein the two or more code blocks are mapped to a transmission resource of the licensed band or a transmission resource of the unlicensed band, and wherein mapping the two or more code blocks comprises:
based on the two or more code blocks being mapped to the transmission resource of the licensed band, a frequency-first mapping scheme is applied;
based on the two or more code blocks being mapped to the transmission resource of the unlicensed band, a time-first mapping scheme is applied, wherein the time-first mapping scheme sequentially maps OFDM symbols from a first OFDM symbol to a last OFDM symbol at a same subcarrier, and repeats mapping at a next subcarrier, and wherein the frequency-first mapping scheme sequentially maps OFDM symbols from a first subcarrier to a last subcarrier at a same OFDM symbol, and repeats mapping at a next OFDM symbol.

12. An apparatus comprising:
at least one processor; and
at least one computer operably connectable to the at least one processor and storing instructions that, when executed by the at least one processor, perform operations comprising:

receiving, by user equipment (UE) from an evolved Node B (eNB), information regarding for a number of two or more code block groups, wherein two or more code blocks are grouped into the two or more code block groups, and a codeword is divided into the two or more code blocks;

receiving, by the UE from the eNB, a Physical Downlink Shared Channel (PDSCH) comprising the two or more code block groups; and transmitting, by the UE to the eNB, a plurality of Hybrid Automatic Repeat and Request Acknowledgments/Negative-Acknowledgments (HARQ-ACKs/NACKs) based on the number of the two or more code block groups that were received in the PDSCH, wherein the two or more code blocks are mapped to a transmission resource of a licensed band or a transmission resource of an unlicensed band, and wherein mapping the two or more code blocks comprises:
based on the two or more code blocks being mapped to the transmission resource of the licensed band, a frequency-first mapping scheme is applied;
based on the two or more code blocks being mapped to the transmission resource of the unlicensed band, a time-first mapping scheme is applied, wherein the time-first mapping scheme sequentially maps OFDM symbols from a first OFDM symbol to a last OFDM symbol at a same subcarrier, and repeats mapping at a next subcarrier, and wherein the frequency-first mapping scheme sequentially maps OFDM symbols from a first subcarrier to a last subcarrier at a same OFDM symbol, and repeats mapping at a next OFDM symbol.

* * * * *